(12) United States Patent (10) Patent No.: US 9,405,807 B2
Obernikhin et al. (45) Date of Patent: Aug. 2, 2016

(54) PERSONNEL RECRUTEMENT SYSTEM USING FUZZY CRITERIA

(71) Applicant: Amazing Hiring, Inc., Redwood City, CA (US)

(72) Inventors: Vitaly Obernikhin, Moscow (RU); Sergey Dmitrichenko, Moscow (RU); Ilya Galyetov, Moscow (RU)

(73) Assignee: AMAZING HIRING, INC., Redwood City, CA (US)

( * ) Notice: Subject to any disclaimer, the term of this patent is extended or adjusted under 35 U.S.C. 154(b) by 239 days.

(21) Appl. No.: 14/255,659

(22) Filed: Apr. 17, 2014

(65) Prior Publication Data

US 2014/0317079 A1 Oct. 23, 2014

(30) Foreign Application Priority Data

Apr. 18, 2013 (EA) .................................. 201300375

(51) Int. Cl.
*G06F 7/00* (2006.01)
*G06F 17/00* (2006.01)
*G06F 17/30* (2006.01)

(52) U.S. Cl.
CPC ................................ *G06F 17/30542* (2013.01)

(58) Field of Classification Search
None
See application file for complete search history.

(56) References Cited

U.S. PATENT DOCUMENTS

| 8,601,002 | B1 * | 12/2013 | Ali | G06F 17/3053 707/748 |
| 9,053,157 | B2 * | 6/2015 | Ali | G06F 17/3053 |
| 2001/0034630 | A1 * | 10/2001 | Mayer | G06Q 10/063112 705/7.14 |
| 2009/0094090 | A1 | 4/2009 | Dow | |
| 2011/0015958 | A1 * | 1/2011 | April | G06Q 10/06 705/321 |
| 2012/0095933 | A1 * | 4/2012 | Goldberg | G06F 17/30699 705/321 |
| 2013/0290208 | A1 * | 10/2013 | Bonmassar | G06Q 50/01 705/321 |
| 2014/0089303 | A1 * | 3/2014 | Ali | G06F 17/3053 707/723 |

FOREIGN PATENT DOCUMENTS

| JP | 2005327028 | 11/2005 |
| WO | 9954835 | 10/1999 |
| WO | 2004111866 | 12/2004 |

OTHER PUBLICATIONS

Search report in Eurasian Application No. 201300375, dated Apr. 14, 2014.

* cited by examiner

*Primary Examiner* — Tuan A Pham
(74) *Attorney, Agent, or Firm* — Bardmesser Law Group

(57) ABSTRACT

A data search system provides access to information about potential job candidates, in particular, their professional skills, work experience, education, professional activity and other aspects, which are of importance to a recruiter. The invention can be employed by recruiting agencies, HR departments, independent experts and other staffing agencies, as well as managers looking for new employees. Since there is usually no direct links between different profiles of the candidate, the system makes some distributed profiles "fuzzy" (i.e., unverified). These "fuzzy" profiles are also displayed during the search, and the user of the system can choose the needed profile from the database.

20 Claims, 4 Drawing Sheets

PERSONNEL RECRUTEMENT SYSTEM USING FUZZY CRITERIA

CROSS-REFERENCE TO RELATED APPLICATIONS

This application claims priority to Eurasian Application No. 201300375, filed Apr. 18, 2013, incorporated herein in its entirety.

BACKGROUND OF THE INVENTION

1. Field of the Invention

The present invention relates to data search systems designed for personnel recruitment using fuzzy criteria.

2. Description of the Related Art

Recruiters have two main problems when they are looking for candidates:
 a. There are not enough candidates
 b. It is hard to assess candidates before an interview:
  i. Qualification of a candidate
  ii. Probability of a particular candidate to be hired by a particular hiring manager for reasons not directly related to qualification but rather related to "culture fit".

To find enough candidates, recruiters use different resources:

A conventional method of searching for candidates is to search through so-called "job boards," where "active" candidates (i.e., those, who are currently looking for job) upload their CVs (resumes) providing a detailed account of their professional skills, education, certifications, work experience at different companies and references. The problem of this conventional method is that the highly qualified candidates usually change their job "by invitation," so that they have no need to write up a CV and post it on a job website. Thus, this conventional method can only be used to look for "active" candidates, which is not sufficient.

Many candidates have their profiles/accounts on various professional social networks and their own websites. The candidates can also join professional discussions on Internet forums and, in case with programmers, participate in open-source projects. In order to find job candidates, recruiters use various job-seeking services (e.g., dice.com, monster.com, superjob.ru, headhunter.ru, etc.), professional social networks (LinkedIn, Xing, Viadeo, Zerply, Moikrug.ru,), recreational social networks (Facebook, Google Plus, Myspace, VKontakte Twitter, Tumblr,), Q&A forums (rsdn.ru, stackoverflow.com, quora.com, expert-exchange.com), open-source software repositories (e.g., Github, Google Code, Bitbucket, SourceForge, Launchpad, Redmine).

Nonetheless, it is often difficult to find a suitable candidate, since they might have no LinkedIn profile at all, or their profile might provide only partial data (e.g., a Github profile may contain only the name of the candidate and a list of projects they are participating in, and a LinkedIn profile may provide only the name and the city of the candidate, but no skills description or projects they have participated in).

As discussed above, a known method for looking for "passive" candidates using professional social networks (e.g., LinkedIn, Xing, Viadeo, Zerply, Moikrug.ru, etc.) is inefficient. The main problem of this method is that the search yields only the data that the candidate has filled in their profile. Highly qualified "passive" candidates usually have no need to give a full account of their achievements, skills and work experience in their respective field. The reasons are the same as for the lack of their CVs on the job boards. For example, highly qualified software developers can be distinguished mainly by their participation in open-source software development projects or activity in giving answers to difficult problems posted on professional forums dedicated to software development (e.g., Stackoverflow).

Yet another known method is to search for information about potential job candidates (including "passive" ones) on different Internet resources. The problem of this known method is that each individual profile/account of the candidate might miss specific data needed to identify a qualified candidate, such as their professional skills, work experience, projects they have participated in, and/or contacts. Another problem is that the search might yield different profiles of the same candidate, but from different resources that may have been viewed earlier. Thus, it increases the effort needed staff recruiters, who have to look through various resources and spend much more time checking the same candidates, than if they were monitoring only one resource.

Accordingly, there is a need in the art for a system, which creates a single "distributed profile" for the candidate, which would combine all candidates' profiles/accounts on different network resources and supply the missing information for each individual profile.

Assessing candidates before an interview is hard to do, and leads to very broad "recruitment funnels"—companies have to interview a lot of candidates (sometimes up to 20-30) to hire one.

Assessing candidates before an interview consists of two parts: (a) qualification and (b) "culture fit" assessment.

A conventional method for assessment of qualifications can include having candidates pass some automatic tests, however, in a situation with a lack of candidates, the candidates are not willing to spend a few hours to pass some tests, so this method is often inefficient, as it might turn away good candidates.

At the same time, for many candidates, there is enough publicly available information to assess qualification of a candidate including (a) his/her career progression based on the information in a resume or in a profile on a professional social network; (b) proficiency in a particular technology of companies the candidate worked at; (c) "online reputation" of a candidate consisting of "votes" or "likes"—when peers vote for (or "like" good answers (or good questions) the candidate gives on highly professional forums; or (d) for software developers there might be even available source code they have written for open-source projects and (e) peer-review of the source code—other developers can "fork" code written by this developer or put a star on the code ("like" it) or "follow" the developer. All this information allows assessing qualification of a candidate prior to an interview.

Assessing "culture fit" is a problem that is often missed by someone out of the recruitment industry, but experienced recruiters know that the probability of a particular candidate to be hired by a particular hiring manager is significantly higher if the candidate and the hiring manager have graduated from the same educational institution or worked in the same set of companies in the past, or grown up in the same geographical area, or (in case of software developers) participated in the same open-source project.

Currently it is hard for recruiters to try assessing candidates by both criteria—qualification and "culture fit." It is just impossible to assess "culture fit" when a recruiter sees a profile with only some information available—e.g., viewing Github profile containing only nickname and email of a candidate.

SUMMARY OF THE INVENTION

The present invention relates to data search systems designed for personnel recruitment using fuzzy criteria that substantially overcomes one or more disadvantages of the related art.

The inventive search system collects publicly available information from dozens of web sources, identifies profiles of the same person on different sources and builds a consolidated profile.

As is known in the search engine industry, for a search engine, it is not enough to have a large collection of information—one needs to have a ranking algorithm which gives most relevant results first.

The inventive search system has such an algorithm which ranks candidates based on various sets of criteria: (a) qualification, and (b) "culture fit", thus solving the problem of assessing a candidate prior to an interview. An important ranking criteria is also (c) potential interest of a candidate in changing his current job The system assesses qualification of a candidate by using (a) his/her career progression based on the information in a resume or in a profile on a professional social network; (b) proficiency in a particular technology of companies the candidate worked at; (c) "online reputation" of a candidate consisting of "votes" or "likes"—when peers vote for (or "like" good answers (or good questions) the candidate gives on highly professional forums; (c) for software developers there might be even available source code they have written for open-source projects and (d) peer-review of the source code—other developers can "fork" code written by this developer or put a star on the code ("like" it) or "follow" the developer. All this information allows assessing qualification of a candidate prior to an interview.

The system assesses "culture fit" for a candidate, the hiring manager and the team by many parameters, the simplest ones are: (a) if the candidate and the hiring manager (team) have graduated from the same educational institution or (b) worked in the same set of companies in the past, or (c) grew up in the same geographical area, or (d) (in case of software developers), participated in the same open-source project.

In addition to simple parameters, there are many complex ones, for instance, if the candidate "liked" a few thousand objects on a social network (e.g., Facebook) and the hiring manager liked a few thousand objects on Facebook and there is a high intersection among those objects (e.g., 80% overlap), it indicates that interests of the candidate and the hiring manager have a lot in common.

The data search system provides access to information about potential job candidates, in particular, their professional skills, work experience, education, professional activity and other aspects, which are of importance for a recruiter. The invention can be employed by recruiting agencies, HR departments, independent experts and other staffing agencies, as well as mangers looking for new employees. Since there is usually no direct links between different profiles of the candidate, the system makes some distributed profiles "fuzzy" (i.e., unverified). These "fuzzy" profiles are also displayed during the search, and the user of the system can choose the needed profile(s) from the database.

According to an exemplary embodiment, the "fuzziness" of linking some profiles into a "distributed" profile is used. For instance, there might be two profiles having the same name and last name (e.g., Jack Smith), which studied in Stanford at the same time and after graduation worked at the same companies. If it turns out that both persons were raised in Austin, Tex. and studied at the same high school at the same time—the probability is very high that both profiles represent the same person. The system can capitalize on the high probability, though there is a small chance that these two persons are different and not compatible (business-wise). This is the case when there is some fuzziness in the linkage of the two profiles into a "distributed" profile. The fuzziness can be weeded out later when more information is available (e.g., when the system finds out that both profiles have the same email).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
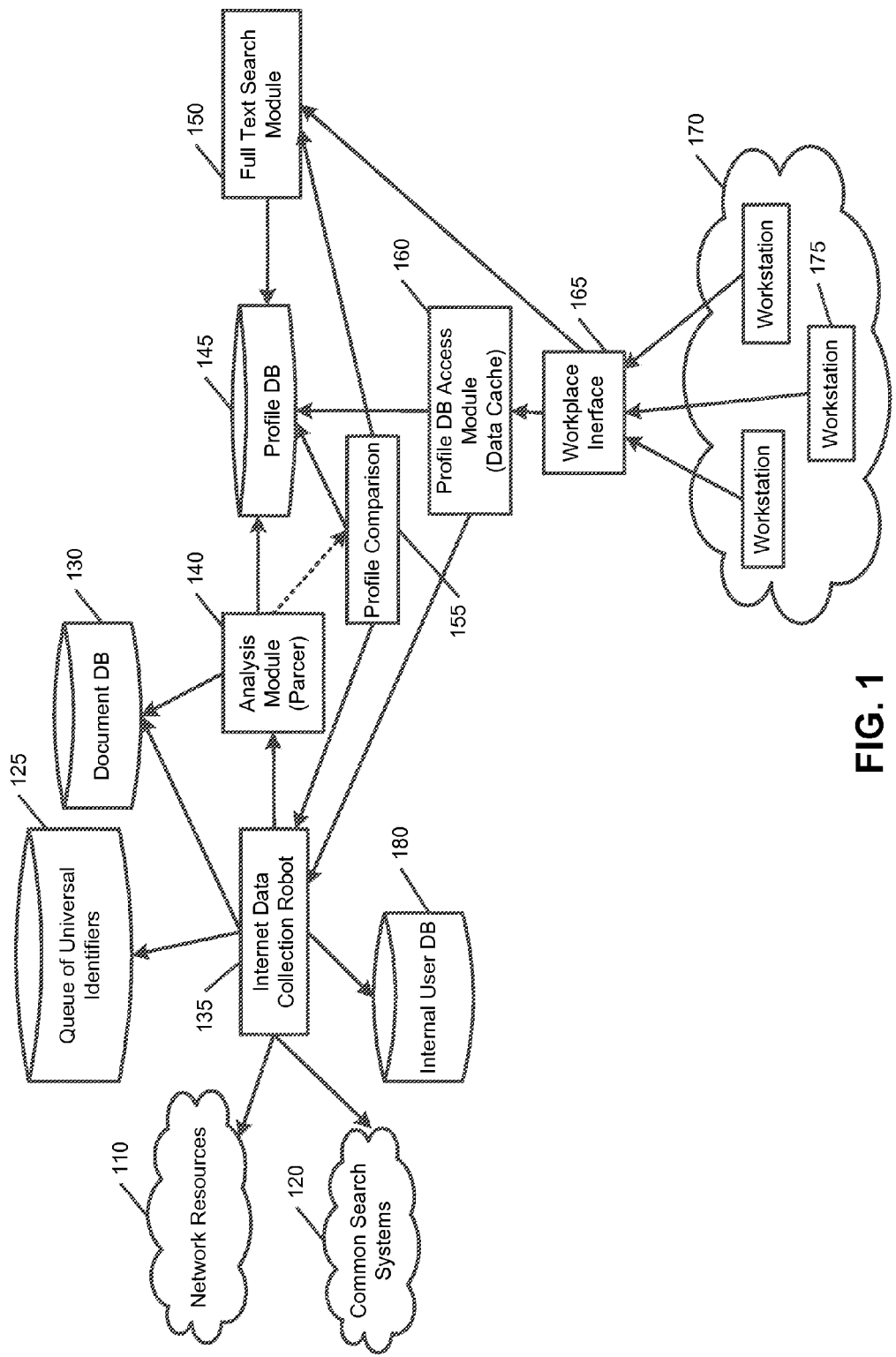
FIG. 1 illustrates an exemplary embodiment of the system.

The present invention relates to data search systems designed for personnel recruitment using fuzzy criteria. Fuzzy criteria here might be skills that are not easy to define strictly—e.g., "Product Management Skills," or "Strong Software Development Background," etc.

Many candidates have their profiles/accounts on various professional social networks, their own websites; they also join professional discussions on Internet forums and, in case with programmers, participate in open-source projects. According to an exemplary embodiment, since there are no direct links between different profiles of the candidate, the system makes some distributed profiles "fuzzy" (i.e., unverified). These "fuzzy" profiles are also displayed during the search, and the user of the system can choose the needed profile from a database.

The present invention, unlike a conventional approach, provides for an automated search for both "active" and "passive" job candidates, generates "distributed profiles," that combine information gathered from different profiles/accounts of the candidate registered on various network resources, thus making it possible to find highly qualified candidates, who would be missed otherwise. A recruiter can fill in the desired job requirements in a search query, such as skills, work experience, education, age, etc. The search yields a number of "distributed profiles," wherein each such profile provides the necessary data. According to the exemplary embodiment, "Distributed" or "Consolidated" profiles are stored in the system's database (and the system itself is running "in the cloud," though it can be also run within a corporate data center). Profiles comprising a distributed profile are stored on different third-party web sources in the cloud.

Currently, recruiters have to search through various resources, spending much time on each (based on different estimations, 30-40% of the recruiter's time is spent on candidate search on the Internet), while many qualified candidates are missed, because they have no profile/account on the resource in question, or their profile/account does not provide enough data. According to the exemplary embodiment, use of the "distributed profiles" reduces the time spent on search and makes it possible to locate highly qualified candidates, who would be missed otherwise.

Furthermore, the system increases search efficiency manifold, as it greatly reduces recruiter's time spent on the search, because the recruiter does not have to search through a number of various Internet resources. According to the exemplary embodiment, the automated staff recruitment system includes:
a data storage;
a database management system;
at least one user workstation;
an automated search unit;
an Internet data-collection unit;
a data-analyzing unit;
an Internet data cache; and
a cache data-extracting unit.

The data storage contains candidates' identification data and related information that has been verified. The user workstation is connected to the automated search unit so that the user can enter the search query parameters into the unit. The database management system provides data input to the database and extracts candidate-related data from the database according to the search query parameters. The data cache stores the collected information and groups it according to candidates' identification data and network resources, from which the information is cached. The automated search unit searches for data according to the query parameters entered by the user at the workstation and to extracts candidate's information from the database according to the given criteria.

The cache data-extracting unit is able to search for entries corresponding to the given criteria and to compare Internet profiles with the extracted database profiles' entries. The system includes an entry-comparing unit, which transfers cached information to the data base, if this information is verified and found to correspond to a real candidate's profile, or stores the data in the cache providing the database with a link to the cache entry, if the information is not verified and/or its correspondence is fuzzy.

According to the exemplary embodiment, the system includes an extra automated network data-collecting unit, which is able to connect to a network resource using identification data of a user of a given resource. Particularly, if the user of the given resource also is the user of the candidate-search system, then, the automated network data-collecting unit uses its connection to find out whether some candidates belong to the first circle of the user of the given resource. The data cache stores data for a limited time.

Furthermore, the data can be transferred from the cache to the database, if it is verified by a user with administrator's rights (and at least one user of the system should be identified as having such rights, while at least one user of the system may have a second administrator profile with the right to confirm data correspondence to database profiles). The search query can rank entries according to the level of correspondence of the candidate's data to the search query parameters. The search query can also calculate a degree of correspondence (e.g., as a weight coefficient, based on the number of matches of key criteria). Also, the system can rank search results according to the probability of a candidate responding to a job offer by the recruiter.

The probability calculation is based on secondary data regarding a desire of the candidate to change his or her current job. The probability can also be calculated based on the candidate's job search activity. Particularly, the probability of the candidate changing their job is based on their network (forum) activity fluctuations, and/or financial indexes of their current employer, and/or information about possible cuts of the workforce by their current employer, and/or update statistics of the candidate's profile in professional social networks, and other relevant data.

When searching for candidate's profiles/accounts on the Internet resources, the system can employ general search engines, such as Google, Yandex, etc. When the search query result is displayed, the candidates can be ranked according to the number and quality of their published works, such as professional publications and patents in the areas corresponding to the skills and the keywords passed as search parameters. To this end, publishing databases can be used to provide additional data for candidates' profiles.

The quality of the papers can be accessed through external metrics—e.g., "citation index" (how many papers including patents cited or referenced a particular paper—http:**en-.wikipedia.org/wiki/Citation_index), reputation of scientific journals where the paper was published etc.

Also, the candidates can be ranked according to the level of correspondence of their profiles to the profile of a potential hiring manager/supervisor, because if the candidate has similar education and experiences, there is a higher chance of him working successfully with the supervisor. Additionally, the supervisor will be more inclined to interview such candidate and offer him a job. The level of correspondence to the potential supervisor (or a hiring manager) is estimated by the system, which checks whether both the candidate and the supervisor graduated from the same educational institutions and/or worked in the same enterprise (regardless of time periods), participated in the same open-source software development projects, etc.

The same approach can be implemented to compare candidates' profiles with those of current employees by creating a "generalized" profile of enterprise workers. The "generalized profile" can be created automatically by analyzing profiles of the team which has the opening. For instance, if 80% of the team graduated from the same educational institution, say, MIT, then the generalized profile will have "MIT" as education. Likewise, if, say, 92% of the team worked at Google in the past, then the generalized profile will have "Google" as a previous employer.

Another example: suppose, that a Job Description says C++ is a required skill, upon analyzing team profiles one can figure out that 83% of the team in addition to C++ know Assembler. As a result, both: C++ and Assembler will be set as "skills" in the generalized profile. The profiles can be included into the database in order to improve the search quality. The generalized "personal profile" of a typical employee can be created using information about the age of employees, educational institutions they attended, enterprises they worked at, music and messages posted in social networks they "like."

The search query parameters can be based on a real profile, and the system can look for candidates corresponding to that profile and rank them accordingly, while the user of the system can mark more/less desirable points to be considered during the search. The level of correspondence in this case can be estimated based on one or several parameters, such as similar professional skills, education, work experience, published works, similar professional interests, similar things posted and "liked" in social networks.

Users of the system can provide it with the feedback on which candidates are a good fit for the job, and which ones are not. It can be implemented with a special button (e.g., "+" or two buttons "+" and "−") on a candidate profile. When a hiring manager and/or a recruiter tell(s) system a candidate is a good one, the system takes this into account and adjusts search output appropriately. For instance, it can analyze candidates that are a good fit for the job and build a "generalized" profile of a candidate who is a good fit for the job. The generalized profile can be built in a manner similar to building a "generalized" profile of a team.

The hiring manager can benefit from such a system, because he might not need to create a formal "Job Description" by recruiter's request, which might often be an embarrassing task for a technical team leader. The hiring manager and the recruiter can simply sit together and use the system by issuing a simple query to the system and then providing the system with the feedback on good candidates.

The exemplary system can be used in situation, where there are several network resources (either linked to each other or not), containing information about several potential candidates. The information may be presented in the form of a CV (resume) or as a profile/account. Some data may be missing (or omitted), and some data might be distorted because of the purpose of publishing—i.e., it might contain inaccurate information or data copied from other candidates' CVs or profiles.

Candidates may have their profiles on different resources, or even several profiles on the same resource. From here on, a "candidate" is a potential employee, who is looked for by a recruiting agency using a special workstation. The candidate's profiles may contain no particular data needed to identify them. Thus, the objective of the system is to find a candidate in the general database or integrate a new candidate, if there is no profile.

A candidate's profile can contain the following data:
first name;
middle name;
last name;
login or nickname used for registration on a resource;
photo;
current location or searched location for potential job (e.g., city, state);
date of birth;
gender;
work experience (enterprises, positions, time periods, finished projects, achievements, technologies used, etc.);
education;
skills;
contacts (email address, phone number, messenger ID—e.g., Skype);
interests;
blogs and sites, where the candidate is registered (including nicknames, if available);
account IDs for various resources.

Candidates' profiles often do not contain links to other profiles on other resources, which makes it difficult to locate the candidate registered on different resources.

The exemplary embodiment provides a method for creating a "distributed profile" to facilitate candidate search. The system allows to create a distributed profile using several profiles/accounts, if:

the candidate's individual profiles/accounts are filled in different languages (including Russian, English, German, French, Spanish, Ukrainian, Byelorussian, etc.)
individual profiles/accounts contain transliterated elements (e.g., a name of the university);
individual profiles/accounts contain various English and French spelling of the name (e.g., Alexander Shirokov and Alexandre Chirokov may refer to the same person);
the system is aware of the fact that a person can use same images (pictures) in their various individual profiles/accounts, and thus the image can be used to identify the person's profiles, even if the profile information differs substantially;
the system can employ external services to generate a distributed profile using databases containing individual profiles/accounts, such as gravatar.com, fullcontact.com, falcon.io;
the system can use links between profiles provided by the candidate themselves.

When creating a "distributed profile," the system locates profiles/accounts of the candidate on various resources, identifies the person using various, occasionally "fuzzy" criteria and combines individual profiles/accounts into a single "distributed profile."

According to the exemplary embodiment, the system operates as follows. If the system has an access to an external candidates' profiles database, it performs indexation and organizes the candidates' data according to their skills, work experience, education, contacts. In case there are multiple external databases, the system performs additional indexation and organization, and then begins to create a distributed profile of a candidate based on their first and last name, location, education institution they attended during a given period of time, enterprises they worked at, given contacts, personal image (photo) and other associated data.

In case the system is unable to combine two profiles reliably, but there is a high probability that both profiles belong to the same person, the system marks them as such, providing a link between the two for the system users, who verifies the information and either confirms or rejects the link.

The recruitment agency may opt to include their proprietary internal database to be used only inside the agency. In this case, the system performs indexation of data in the internal database and, then, creates distributed profiles based on CVs from the internal database and external network profiles/accounts. If needed, the information in the internal database is updated using links to external candidates' profiles. In case the system is unable to associate an external profile with the existing one reliably, but there is a high probability it belongs to the same candidate, the system provides a link to the external profile marking it for an additional check by the user (i.e., a recruiter), who then verifies the information and either confirms or rejects the link.

In order to improve quality of the search, the system can collect data for a given specialization (e.g., software development). Also, the system helps to "assess" candidates according to their professional achievements by supplying missing information or verifying the information provided by candidates, which enhances the preliminary assessment of candidates significantly. For instance, highly qualified or high-ranked candidates may add some "extra" achievements to their profiles, e.g., a number of employees who worked under the candidate, academic degrees and titles, scientific works, publications, etc. The system can perform a search for the employments, degrees and titles and verify them. Such preliminary assessment can help eliminate sub-par candidates at early stages.

Low-ranked or not very qualified candidates often have identical profiles, but their "achievements" can be registered on various resources (e.g., a number of bans, "likes," and informative/non-informative posts). According to the exemplary embodiment, the system can have a "profile supplement" feature: if the recruiter is unsure whether to select a given candidate or not, he can ask for additional information regarding key skills (e.g., scientific or literary works, forum posts, etc.). As an option, such information is a subject to copyright laws and will be deleted after viewing, but the links can be saved, if needed. In one exemplary embodiment, the system may employ an "anti-plagiarism" feature to verify the authorship. There are numerous anti-plagiarism systems on the market. Generally, what they do is split a paper into smaller chunks (e.g., paragraphs) and then search for these chunks in other published papers. The inventive system may employ an "anti-plagiarism" feature, search engines (e.g., Google), or scientific paper databases.

According to the exemplary embodiment, the system uses cloud computing and includes the following elements:

An Internet data-collecting unit, which interacts with multiple sources: professional social networks, professional forums, open-source software repositories. If the system has been granted access to an external resource, the unit indexes data from this resource and passes it on to data storage and processing units;

High-capacity data storage and processing units, that store and process data, organize each candidate's information (name, work experience, key skills, etc.) and, then, analyze it in order to conduct search for other network profiles/accounts of the person on other resources: social networks, professional forums, patent databases, scientific publications databases and other sources.

A natural language text processor, which analyzes messages posted by the candidates in order to find out their key skills, professional interests, completed projects and work experience. In the exemplary embodiment, this unit can be amplified by a speech recognizing unit, which transforms speech into printed text.

An indexing unit, which sorts and organizes search data for each candidate.

A unit or a distributed computing environment is used to generate a "distributed profile" of a candidate, or to match network profiles/accounts from various resources belonging to the same person.

A unit or a distributed computing network used to compare candidate's profiles on various resources in case there is no full information about the candidate. The unit utilizes the technology of machine learning, which, according to an aspect of the invention, enables the system to create "fuzzy" distributed profiles of candidates using information provided in their individual profiles/accounts, add links between profiles and mark them for the user of the system.

Thus, the user is able to analyze the profile node provided by the system and either confirms the distributed profile by approving the system's "guess" or rejects it giving a feedback suitable for further machine learning. Such positive or negative feedback enhances the precision of the "fuzzy" distributed profiles created by the system.

An interactive web component for user interactivity, which can be embodied into user's workstation. The workstation can grant access to main control elements, both soft- and hardware, which efficiently provide search and other types of queries, search reports, and other data. The user specifies candidate search parameters, which can contain the following—skills; keywords; enterprises the candidate worked at; number of employees led by the candidate; job positions/titles; location; age; gender; educational institution(s) the candidate graduated from; work experience (in years); latest work duration; whether the candidate is currently looking for a job (i.e., "active" or "passive"); contacts (email address, phone number, Skype, and other means of communication); Internet resources containing candidate's other profiles/accounts; whether the candidate belongs to the first/second circle of acquaintances of the user of the system (the recruiter).

Any search parameter can be marked as "essential," "desired," "undesired".

The search parameters may be entered at once, or can be added and/or refined later, after the system displays search results. When displaying the results, the system can show the user a condensed version of the candidate's profile containing only the parameters corresponding to those entered in a search query (e.g., "C#", "MS SQL"). The information provided in the condensed version should be sufficient for a recruiter to decide promptly whether to examine the given candidate more thoroughly or to skip him over and go to the next one. In particular, the candidate's condensed profile can contain the following parameters:

Whether the candidate is looking for a job;
Picture;
First and Last Name;
Job position;
Age;
Location;
Contacts (e-mail, phone no., Skype, etc.);
Work experience (enterprises the candidate worked at);
Skills;
Education;
Whether the candidate has profiles on various Internet resources (e.g., LinkedIn, Xing, Viadeo, Moikrug.ru, Facebook MySpace, VKontakte, rsdn.ru, stackoverflow.com, quora.com).

The system conducts the search using the specified parameters and displays the result to the user, who is able to modify the query (e.g., change a list of enterprises a job candidate could have worked at), or accept the variant(s) of query modification proposed by the system. As an option, the system can propose to modify the list of skills used to search for candidates.

FIG. 1 illustrates an exemplary embodiment of the system. The system includes an Internet data-collecting unit 135 (or a "Robot"), which collects data from the Internet—see arrow 110, employing common search engines 120, as well as from an internal database 180 provided by the client (e.g., a staff recruitment agency), if necessary. The unit 135 also manages and stores text fields called from the database and documents, forming a queue of IDs 125 (i.e., universal resource locators, URLs), which are needed to extract candidates' profiles from the Internet. The unit 135 can be implemented as a separate server or as a server procedure. In the latter case, the unit 135 can perform the operations needed while the system is idle or there are no higher priority tasks.

The unit 135 uses HTTP protocol and also Application Programming Interface (API), and periodically (also in background mode) scans open network resources 110 (e.g., professional forums for developers, professional social networks, etc.). In order to find a specific set of documents on the Internet, the unit 135 can also address common search engines 120. Furthermore, the unit 135 can scan the internal database 180 provided by the user in order to get data about candidates, who have been already entered into the internal database 180, and, thus, assess the efficiency of data collected from the Internet. Furthermore, it can update (or discard) the information stored in the internal database 180 using data from the Internet, if it corresponds to the candidate listed on the network resource; or it can use this information for further data verification, if there is unique data belonging to different profiles of the candidate.

Also, the data collected can be used to refine the information stored in the internal database 180. Documents obtained from the Internet (a candidate's profile/account, a candidate's scientific article, posts from professional forums, etc.) can be stored in the document database 130 and, subsequently, be transferred alongside with the query response, to the data-analyzing unit 140 (or "Parser"), which, then, extracts useful data from the documents.

The Internet data-collecting unit 135 can act indirectly following the request from the workstation user interface 165 through DB access module 160 to look for a specific candidate on a specific resource.

In order to form the URL queue 125, the system adds up candidates' profile page IDs, which can be done based on the results yielded by general search engines, using open information on users of various information sources, and for each recruitment agency the queue is formed according the their own internal database 180.

The Internet data-collecting unit 135 (or "Robot") stores each obtained document (web page) in the document database 130. If the unit 135 fails to collect the document, it provides the latest changes date and error codes instead. The "Robot" 135 maintains the URL queue 125, so that the information is updated periodically (e.g., once a day) or in parallel with profile database updates on the given network resource.

The data analysis unit 140 (or "Parser") extracts organized information about the candidate from the obtained documents such as: first name, last name, skills, etc. The information is transmitted to the profile database 145 to be processed, analyzed, used to make up a distributed profile and displayed in the search report. In case the Internet data-collection unit 135 works indirectly following a request by the user (a recruiter) created by means of the workstation 175 to search for a specific candidate on a specific resource, the "Parser" 140 analyzes the document DB 130 and, then, transmits the organized information immediately to the profile comparison unit 155.

The profile comparison unit 155 is responsible for searching for profiles belonging to a specific candidate, which were obtained by the Internet data-collecting unit 135 from various resources. It is not a trivial task, since candidates do not always explicitly mark their profiles on different websites, and matching names, dates of birth, locations, education institutions are not always a conclusive proof. Candidates may use different languages (English, Russian, etc.), omit some information (e.g., date of birth), and so on.

The profile comparison unit 155 looks for matches between profiles in the profile database 145. As an option, when a network profile/account is transmitted for analysis to the profile comparison unit 155 by the data analysis unit 140 (or "Parser") after the document has been obtained by the Internet data-collecting unit 135 according to the search query created by the user (a recruiter), the profile comparison unit 155 may request the unit 135 to obtain the candidates' profiles from other information resources.

The full text search unit 150 conducts a full text indexation of candidates' profiles so that they can be searched later using keywords and phrases. Indexation follows the natural language morphology rules. When the recruiter prepares a search query using keywords and phrases, the workstation user interface 165 sends a request to the full text search module 150, which returns to the interface 165 a set of candidates' distributed profiles, where the keywords and phrases were found.

As an option, the full text search unit 150 may get a request from the profile comparison unit 155 to search the database for profiles with given parameters during the process of making up a distributed profile. The users of the system create search queries by means of their workstations 175 with the workstation user interface 165. The interface transmits search queries to the profile database access unit 160. The unit 160 controls the access to the profile database 145 and accelerates the data access through storing them in the data cache. When the cache is empty, the unit 160 sends queries immediately to the profile database 145.

Description for Users:

The user, i.e. a recruiter, works at the workstation 175 and fills in a search query by means of the workstation user interface 165, which should contain one or several parameters, such as:

a. skills;
b. keywords;
c. enterprises the candidate worked at, particularly:
  the name of the enterprise,
  or
  the industry branch,
  number of employees;
d. job positions;
e. location;
f. age;
g. gender;
h. educational institution(s) the candidate graduated from;
i. work experience (in years);
j. latest work duration;
k. whether the candidate is currently looking for a job (i.e. "active" or "passive");
l. contacts (email address, phone number, skype, and other means of communication), Internet resources containing candidate's other profiles/accounts;
m. whether the candidate belongs to the first/second circle of acquaintances of the user of the system (the recruiter).

Any search parameter can be marked as "essential," "desirable," "undesired." Search parameters can be changed or modified after the search results are displayed on the workstation 175 monitor. After the search query has been filled via the workstation user interface 165, it is passed on to the profile database access unit 160 and to the full text search unit 150. In case there is no data stored in the cache, the profile database access unit 160 takes the query and processes the query immediately in the profile database 145. Note that the workstation 175 can be implemented on a cloud 170.

Figure 2:
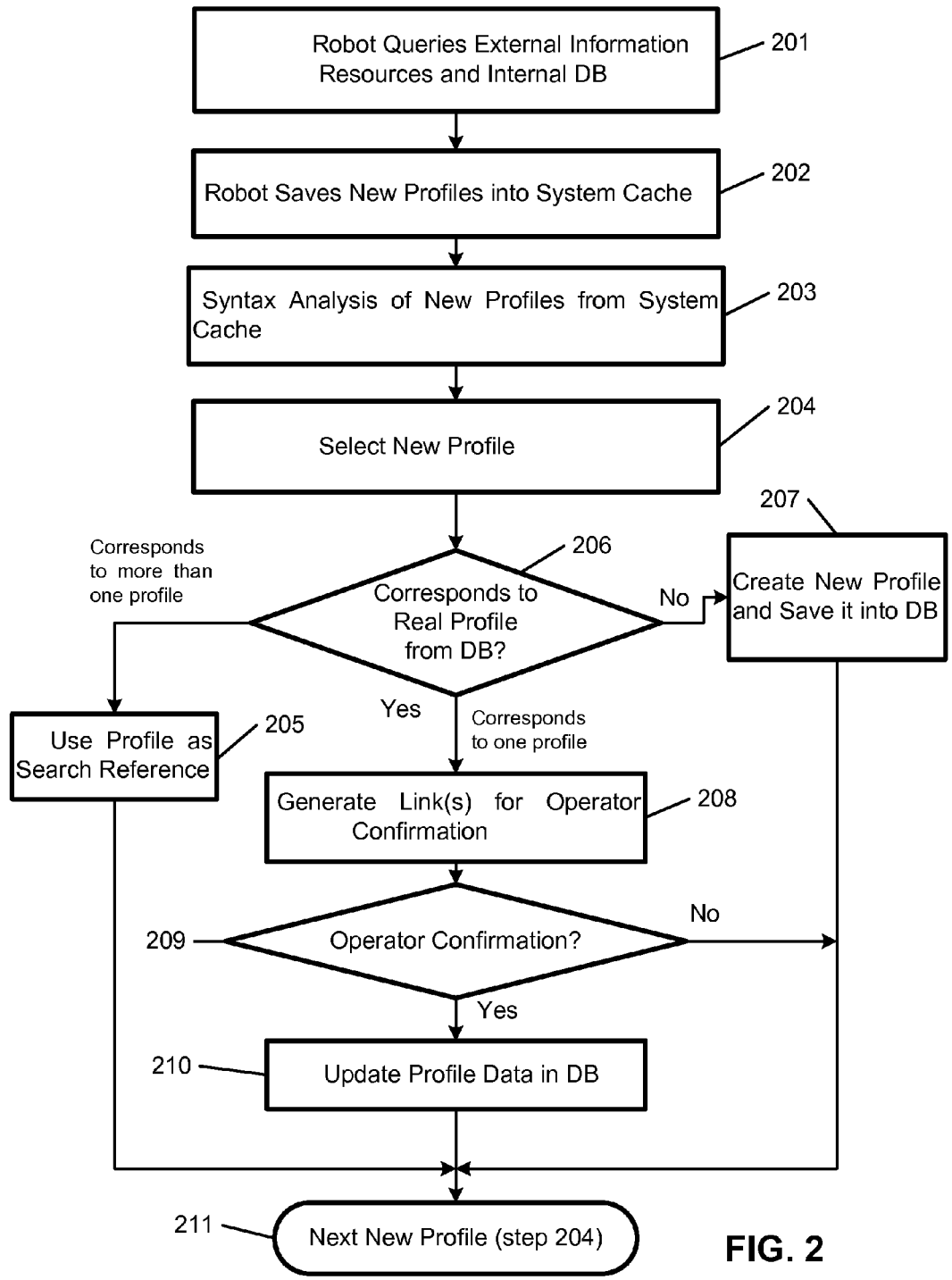
FIG. 2 illustrates a flow chart of the working algorithm of the system.

FIG. 2 illustrates a flow chart of the working algorithm of the system. In step 201, the "Robot" conducts searches through both external resources and internal database provided by the user to find new data, which can be used to search for candidates and define their professional qualities. Newly found profiles are stored in the system cache, in step 202, to be subsequently processed (by a parser) and analyzed.

Then, the cached profiles undergo a syntactic and, if necessary, content analysis in step 203. In an exemplary embodiment, the profiles that cannot be analyzed are deleted from cache and omitted. As another option, empty profiles from a specific resource may be marked as "checked" in order to avoid their repeated analysis. Subsequently, the "checked" profiles are ignored by the Robot.

Cached and analyzed profiles are processed individually in step 204, at which point the cached profiles are compared with real profiles included in the database. In case the cached profile matches multiple real profiles at once, the profile is marked as "reference" and linked to several candidates, which will be shown in further queries—step 205. The situation, when the cached profile matches multiple real profiles may occur if the profile author "borrowed" information from other job seekers or used vague information.

In case the cached profile is an exact match of a real profile, it is marked as such in step 208 and, then, the user of the system should confirm the match in step 209. If confirmed, the cached profile data is entered into the main database in step 210 and deleted from the cache in order to purge it. Otherwise, the process moves to step to step 207.

If the analysis has found content in the cached profile, but it does not correspond to any profile in the database or search parameters, a new profile based on the cached profile data is created and entered into the database in step 207. After the cached profile has been fully processed, the system can restart the sequence in step 211.

Figure 3:
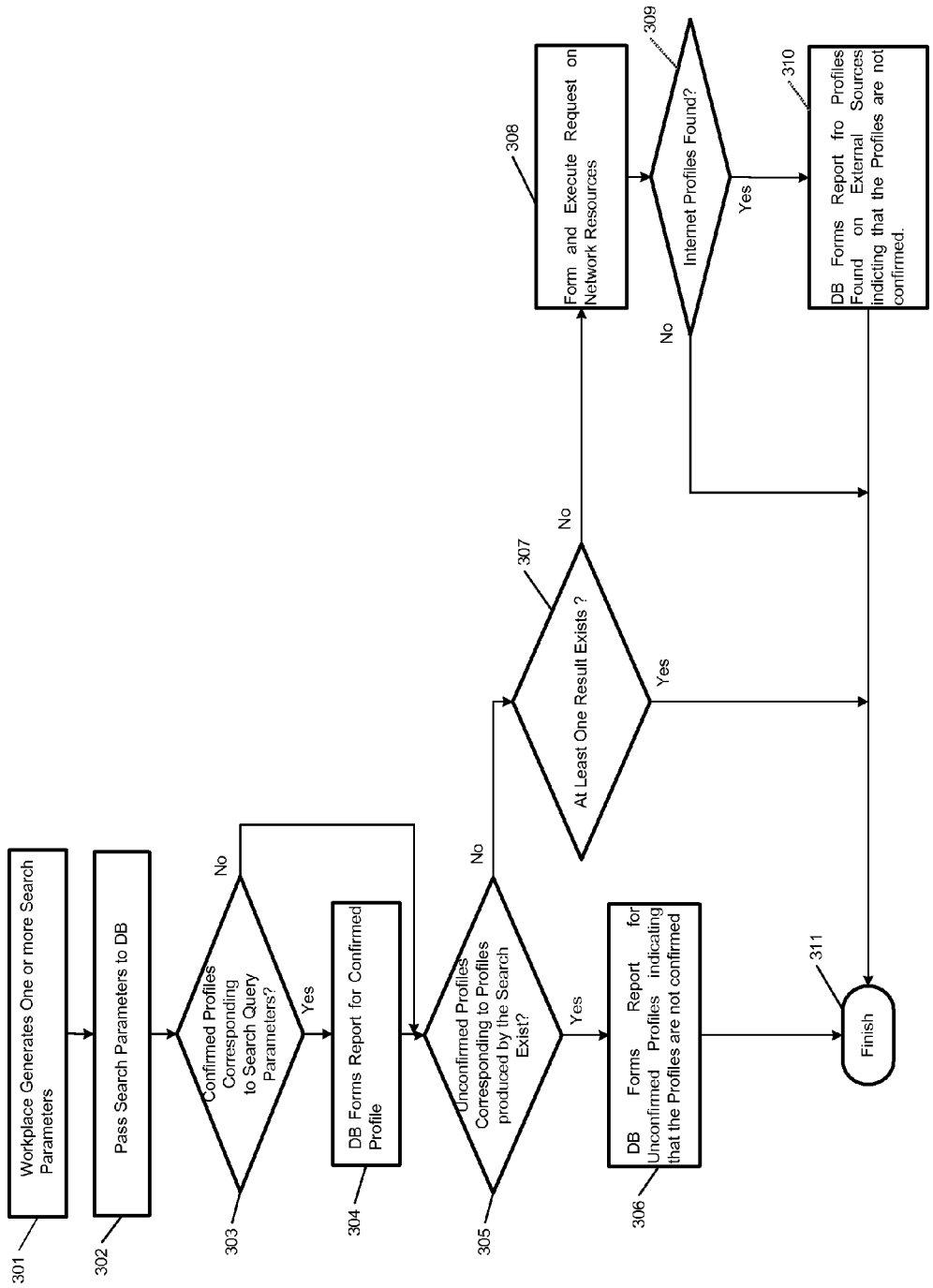
FIG. 3 illustrates a processing algorithm for search queries, in accordance with the exemplary embodiment.

FIG. 3 illustrates a processing algorithm for search queries, in accordance with the exemplary embodiment. The user of the system at the workstation prepares a search query specifying one or several search parameters and/or criteria for a required candidate in step 301. The search parameters are transferred to database search procedures in step 302. The search query looks for profiles in the database, which correspond to the specified parameters and also checks whether there are "verified" profiles in the database, which correspond to the specified parameters in step 303. Here, a "verified" profile is a profile used in step 210 (FIG. 2). In case there are verified profiles in the database, a part of the report regarding them is prepared in step 304. If the database contains no verified profiles, then the system looks for unverified profiles in step 305.

In case there are unverified profiles in the database, a part of the report regarding them is prepared in step 306 specifically marking the found profiles as "unverified." If the database contains no unverified profiles, the system runs one more check to find out if there is at least one item in the resulting report in step 307. If the report is empty, the system prepares a request to conduct a search on external network resources in step 308. If external network resources contain profiles/accounts in step 309, the system prepares a part of the report regarding them in step 310 specifically marking them as "unverified." The process is finished in step 311.

The system conducts search using the specified parameters, and then displays results to the user, who is able to modify the query (e.g., change the list of enterprises a job candidate could have worked at), or accept the variant(s) of query modification proposed by the system. As an option, the system can propose to modify the list of skills, which is used to search for candidates.

When displaying search results, the system first shows a condensed version of the candidate's profile containing only the parameters corresponding to those entered in a search query (e.g., "C#", "MS SQL"). The information provided in the condensed version should be enough for a recruiter to decide promptly whether to examine the given candidate more thoroughly or to skip them over and go to the next one. In particular, the candidate's condensed profile may contain the following parameters:

Whether the candidate is looking for a job
Photo,
First and Last Name
Job position
Age
Location
Contacts (e-mail, phone no., skype, etc.)
Work experience (enterprises the candidate worked at)
Skills
Education
Whether the candidate has profiles on various Internet resources (e.g., LinkedIn, Moikrug.ru, VKontakte, Facebook, rsdn.ru, stackoverflow.com, quora.com).

When looking for a specific candidate with their name passed as a search parameter, if the search query yields no results from the profile database, the system can redirect the query immediately to the Internet data-collecting unit. The unit sends the query to external network resources to find profiles/accounts of the person.

If there are some, the Internet data-collecting unit transfers the documents to the data analysis unit, which extracts organized information about the candidate and, then, transfers it to the profile matching unit, which, in turn, may address the Internet data-collecting unit with a request to find associated candidate data on other network resources to match network profiles/accounts found and create a "distributed profile" of the candidate.

There are three types of high-level tasks which the system performs: (1) indexing the information on the Internet; (2) building a "distributed" profile; and (3) ranking search results based on different criteria.

Indexing the information might seem like a simple task, but if it requires a high-performance, then it becomes a complex computational task.

Much of the difficulty in implementing algorithms and components lies in #2—building distributed profile based on incomplete information and #3—ranking search result—assessing candidates prior to an interview.

Figure 4:
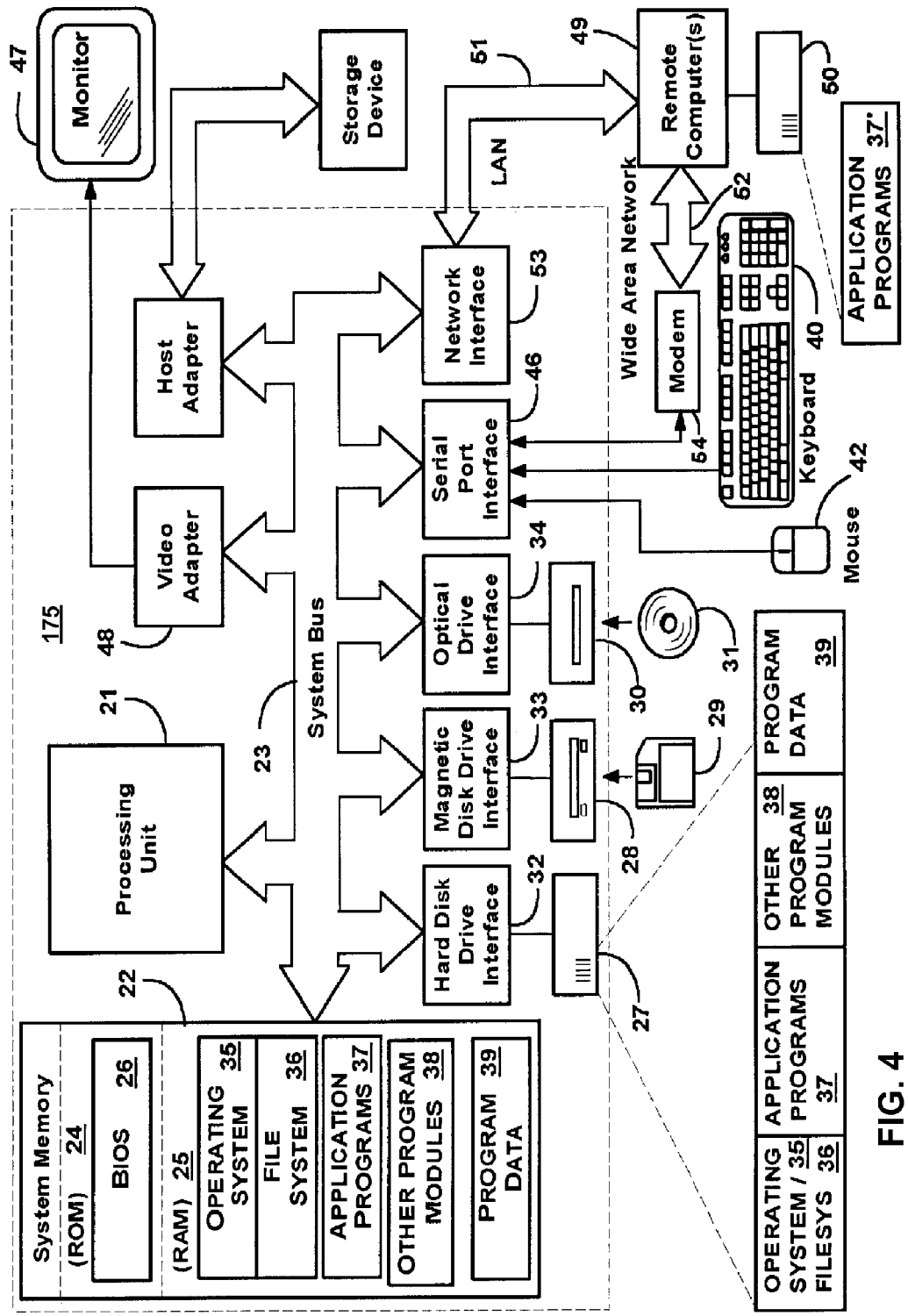
FIG. 4 illustrates a computer or a server that can be used in the exemplary embodiment.

With reference to FIG. 4, an exemplary system for implementing the invention includes a general purpose computing device in the form of a computer or a server 175 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 175, such as during start-up, is stored in ROM 24.

The computer 175 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 175.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 175 includes a file system 36 associated with or included within the operating system 35, one or more application programs 37, other program modules 38 and program data 39. A user may enter commands and information into the computer 175 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 175 may operate in a networked environment using logical connections to one or more remote computers 49. The remote computer (or computers) 49 may be another computer, a server, a router, a network PC, a peer device or other common network node, and typically includes many or all of the elements described above relative to the computer 175, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 175 is connected to the local network 51 through a network interface or adapter 53. When used in a WAN networking environment, the computer 175 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 175, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method have been achieved.

It should also be appreciated that various modifications, adaptations and alternative embodiments thereof may be made within the scope and spirit of the present invention. The invention is further defined by the following claims.

What is claimed is:

1. An automated personnel recruitment system, comprising:
   a data storage;
   a database management system;
   at least one user's workstation having a processor and a memory for implementing the system;
   an automated search agent;
   an Internet data-collection agent configured to collect candidates' profile data from the Internet sources;
   a data-analyzing agent configured to analyze the candidates' profile data;
   a profile-comparing agent;
   an Internet data cache; and
   a cache data-extracting agent,
   wherein:
      the data storage contains verified candidates' profile data;
      the user's workstation is connected to the automated search agent and configured to receive search query parameters provided to the automated search agent;
      the database management system is configured to provide a search query input to the database and extract candidate-related data from the database according to the search query parameters;
      the data cache is configured to store the candidate-related data and group it according to candidates' identification data and Internet resources, from which the information was cached;
      the automated search agent is configured to search for data according to the query parameters entered by the user at the workstation and extract the candidate's profile data from the database according to the given criteria;
      the cache data-extracting agent is configured to search for entries corresponding to a search criteria and compare Internet profiles with the extracted database profiles,
      wherein the entries include a) his/her career progression based on the information in a resume or in a profile on a professional social network; (b) proficiency in a particular technology of companies the candidate worked at; or (c) "online reputation" of a candidate;
      the profile-comparing agent is configured to transfer cached data to the database, if the information, including professional skills and employment data, is verified against data from the Internet resources and corresponds to a real candidate's profile; and
      the profile-comparing agent is configured to store the data in the cache providing the database with a link to the cache entry, if the data is not verified and the correspondence is fuzzy.

2. The system of claim 1, wherein the automated data-collecting agent connects to a network resource using identification data of a user of the resource.

3. The system of claim 1, wherein the data cache stores data for a limited time and the database includes a storage for data transferred from the cache that have not been verified as corresponding to a profile.

4. The system of claim 3, wherein the data transferred from the cache is linked to at least one profile and can be called through search queries, while the completed queries inform the user that unverified data was used during the search.

5. The system of claim 3, wherein the data is transferred from the cache to the database, if it is verified by a user with administrator rights.

6. The system of claim 5, wherein at least one user has a second administrator profile with the right to confirm the data correspondence to the database profiles.

7. The system of claim 1, wherein the search query is used to rank entries according to a level of correspondence of the candidate's data to the search query parameters.

8. The system of claim 7, wherein the correspondence to the search query includes correspondence of the entries and wherein the candidates are ranked by their qualification.

9. The system of claim 7, wherein the search query provides quantitative estimation of the level of correspondence.

10. The system of claim 1, wherein the entries further include (d) for software developers there might be even available source code they have written for open-source projects, or (e) peer-review of the source code.

11. The system of claim 1, wherein the system is configured to calculate a probability of the candidate responding to a job offer.

12. The system of claim 11, wherein the probability calculation is based on quantitative estimation of the candidate's job search activity.

13. The system of claim 12, wherein the system estimates the candidate's job search activity based on any of:
   candidate's network activity fluctuations;
   financial indexes of candidate's current employer;
   information about possible cuts of the workforce by the current employer;
   update statistics of the candidate's profile in professional social networks.

14. The system of claim 1, wherein the system is configured to connect to common search engines to search for candidates' profiles.

15. The system of claim 14, wherein the level of correspondence of the candidate's profile to the potential hiring team is estimated by comparing the candidate's profile with the profiles of employees of the potential superior.

16. The system of claim 1, wherein the candidate is ranked according to the level of correspondence of his profile to the profile of a potential superior.

17. The system of claim 16, wherein the level of correspondence of the candidate's profile to that of a potential hiring manager is estimated by comparing their profiles by any of:
   educational institutions;
   work experience in similar enterprises;
   production activity experience;
   participation in specific open-source projects,
   similar selective activity on the social networks; and
   location where they were raised.

18. The system of claim 1, wherein the search query parameters are based on a real profile, wherein the profile fields serve as query fields.

19. The system of claim 1, wherein a hiring manager and a recruiter provide the system with their feedback on which candidates are a fit for a position and which are not.

20. The system of claim 19, wherein the system takes the feedback into account and adjusts a search output accordingly.

* * * * *